United States Patent [19]

MacEwen

[11] Patent Number: 5,794,883
[45] Date of Patent: Aug. 18, 1998

[54] UNITARY BULK FISHLINE AND CARRIER AND LINE MEASURING DEVICE

[76] Inventor: Richard R. MacEwen, 712 Dream Catcher La., Hesperus, Colo. 81326

[21] Appl. No.: 838,806

[22] Filed: Apr. 10, 1997

[51] Int. Cl.⁶ .......................... B65H 49/26; B65H 59/04; B65H 75/02
[52] U.S. Cl. .................. 242/423.2; 242/397; 242/404.2; 242/396.9; 242/563.2; 242/902
[58] Field of Search ................ 242/397, 404.2, 242/396.9, 423.1, 423.2, 563.2, 566, 597.4, 902, 129.8

[56] References Cited

U.S. PATENT DOCUMENTS

| | | | |
|---|---|---|---|
| 2,727,702 | 12/1955 | Latincich | 242/902 |
| 3,026,059 | 3/1962 | Dennler | 242/597.4 |
| 3,704,840 | 12/1972 | Haddock | 242/902 |
| 4,007,886 | 2/1977 | Kaminstein | 242/902 |
| 4,588,139 | 5/1986 | Lines | 242/902 |
| 5,363,565 | 11/1994 | Kaneko | 242/223 |
| 5,375,788 | 12/1994 | English | 242/597.8 |
| 5,513,463 | 5/1996 | Drinkwater | 242/902 |

*Primary Examiner*—John M. Jillions
*Attorney, Agent, or Firm*—Kenton L. Freudenberg; Maxwell C. Freudenberg

[57] ABSTRACT

A device for supplying fishing line to a fish reeling device from a spool of bulk fishing line and measuring the length of line pulled from the spool by the reeling device. The bulk spool is supported for rotation about a horizontal axis at one end of a T-shaped supporting structure. The other crossed end of the structure carries a flat thin and relatively large diameter circumferentially grooved pulley supported for rotation about a horizontal axis parallel to the spool's axis of rotation. The crossed end also carries a mounting bracket for securing the location of the measuring device along and just off the edge of a flat table, convenient relative to the reeling device. The pulley is manually accessible around its entire periphery and has a shallow groove of semicircular cross section and an inner circumference of predetermined length at the bottom of the groove. A guide member having a line-encirclable manually line-threadable guide portion extends from the T-shaped structure between the spool and the pulley at the plane of the pulley for guiding line from the spool to tangentially enter the pulley groove which is manually accessible to enable line extending from the guide member to be manually wrapped once around the pulley in frictional contact in said groove with the line extending further to the reeling device to drive the pulley when the line is pulled during reeling. Line length is indicated by a counter registering pulley revolutions each of which equals one foot.

20 Claims, 6 Drawing Sheets

UNITARY BULK FISHLINE AND CARRIER AND LINE MEASURING DEVICE

This invention relates to an improved portable unitary device for carrying a spool of bulk fishing line and measuring the length of line being transferred from the spool of bulk line while reeling it up on a fishing reel.

BACKGROUND OF THE INVENTION

For reasons of economics as well as to select different types of lines connected end-to-end on the same reel, fishermen find it practical to buy several different weights and types of fishing line in bulk and load one or more specific lengths of line on a single reel. It is difficult by sight or feel to gauge the length of the line which has been transferred from the bulk spool to the reel.

The problem of measuring the line length is common for all types of reels used for spin casting, fly casting, bait casting and trolling.

The bulk line usually comes on spools having several sizes of open cores, including ½ inch or ¾ inch cores, and end walls from one to several inches apart and usually several inches in diameter. Such spools often carry from a few hundred to a few thousand yards of line. When only a few hundred yards of line are on a new bulk spool it is desirable to know with some precision how much is taken therefrom to be sure that the line can be usefully divided up without waste.

Lines have diameters ranging from about 0.015 to 0.050 inches and require careful handling while loading reels, particularly to avoid damage to their delicate materials and surface coatings. This is perhaps more true of plastic monofilament and braided lines than all metal lines, but the measuring requirement and attendant problems may exist for all types of lines.

Because of the different sizes and shapes of bulk spools, use of prior art devices having a roller frictionally engaging the rotating outer surface of line wound on the bulk spool and operatively connected to an adjacent counter make for difficulty in achieving a simple inexpensive unitary line measuring device.

Other prior art devices use enclosed pinching rollers to measure rope or wire drawn between the rollers, but such devices known to the present inventor do not combine support of a storage spool with a counting device in a simple portable unitary assembly.

U.S. Pat. No. 5,363,565, issued to Kaneko, shows in FIG. 17 a small removable depth counter accessory on a fishing reel, but there is no disclosure therein of a bulk line storage spool combined with a line length counter.

U.S. Pat. No. 5,375,788, issued to English, shows in FIG. 5 a frame hung on a fishing rod and supporting a fishing line refill spool. No line length measuring is disclosed or suggested for use with the refill spool.

U.S. Pat. No. 5,513,463, issued to Drinkwater, discloses a fishing line loading apparatus supporting a spool of fishing line on a fishing rod and applies frictional drag to the spool, but this patent does not disclose a unitary structure combining a measuring device with the supply spool as taught in the present invention.

U.S. Pat. No. 4,588,139, issued to Lines, discloses a very complicated unquestionably-heavy table top apparatus as compared with the present invention. Lines requires a reel to be mounted in the apparatus in engagement with a reel winder for loading line thereon. Lines has a supply spool and a pair of coaxial measuring pulleys, all being rotatable about vertical axes. An electric motor operates different kinds of reels removed from their rods to wind line thereon. Lines lacks the inventive simplicity of the present invention including the simple supporting structure, the configuration of a flat measuring pulley having a very shallow groove with a circumference of one foot, a very inexpensive digital counter and the convenience achieved using horizontal axes for the supply spool and the measuring pulley.

SUMMARY OF THE INVENTION

This invention utilizes a small lightweight portable unitary assembly comprising both a selectably sized spindle for supporting a variety of spools of bulk line and a measuring apparatus with respect to which the line can be readily manipulated and held in preparation for reeling up onto a reeling device such as any fishing reels for the various casting and trolling purposes mentioned above. The measuring apparatus has a large diameter manually accessible open pulley which is driven by a single loop of line pulled therearound by the reeling device. The measuring apparatus also includes a length computing and indicating means in the form of a mechanical digital counter which is actuated by the pulley. The bulk line spool and the pulley rotate on parallel horizontal axes on a simple light-weight T-shaped support frame. The spool is rotatably and releasably carried on the T-shaped support by a spindle which also has means for applying friction to the spool to provide a selectable amount of drag during unwinding of line to prevent spool overrun and keep the line in tension. The line driven pulley has a shallow groove of semicircular cross section and an inner circumference of predetermined length, preferably one foot, enabling a count of pulley rotations to provide a direct indication of transferred line length. The shape of the groove and its vertical orientation for rotation about an horizontal axis, along with apertured guide means encircling the line on opposite sides of and in the plane of the loop around the pulley, help keep the line in the groove until the reeling apparatus applies tension and starts reeling in the line to be transferred.

An object of this invention is to achieve a small low cost simple line measuring device which has very wide or almost universal application during transferring up to hundreds of yards of line from spools of bulk line to fishing reels.

Another object of the invention is to provide a compact line measuring device which can be easily clamped or fastened to the top edge of a table or work bench with the operating parts of the device conveniently located off the edge to facilitate use of two hands for reeling of a measured quantity of line from a bulk spool of line.

A further object of the invention is to provide a simple portable fishing line supply and line measuring device which requires no precise relative positioning of a reel and can be used to transfer and measure a quantity of line from a bulk spool of line to a fishing reel whether or not the reel is secured on a fishing rod reel support.

Another object of the invention is to provide a line measuring device for use in reeling line from a bulk spool to a fishing reel with minimum detrimental effect on the line being transferred.

Another object of the invention is to provide a line measuring device for use in reeling line from a bulk spool to a fishing reel and having a readily manually accessible counter-actuating vertically-oriented pulley arrangement which retains the line after initial manual positioning of the line on the device in reeling orientation until the line is pulled by the reel.

DETAILED DESCRIPTION OF THE INVENTION

Figure 1:
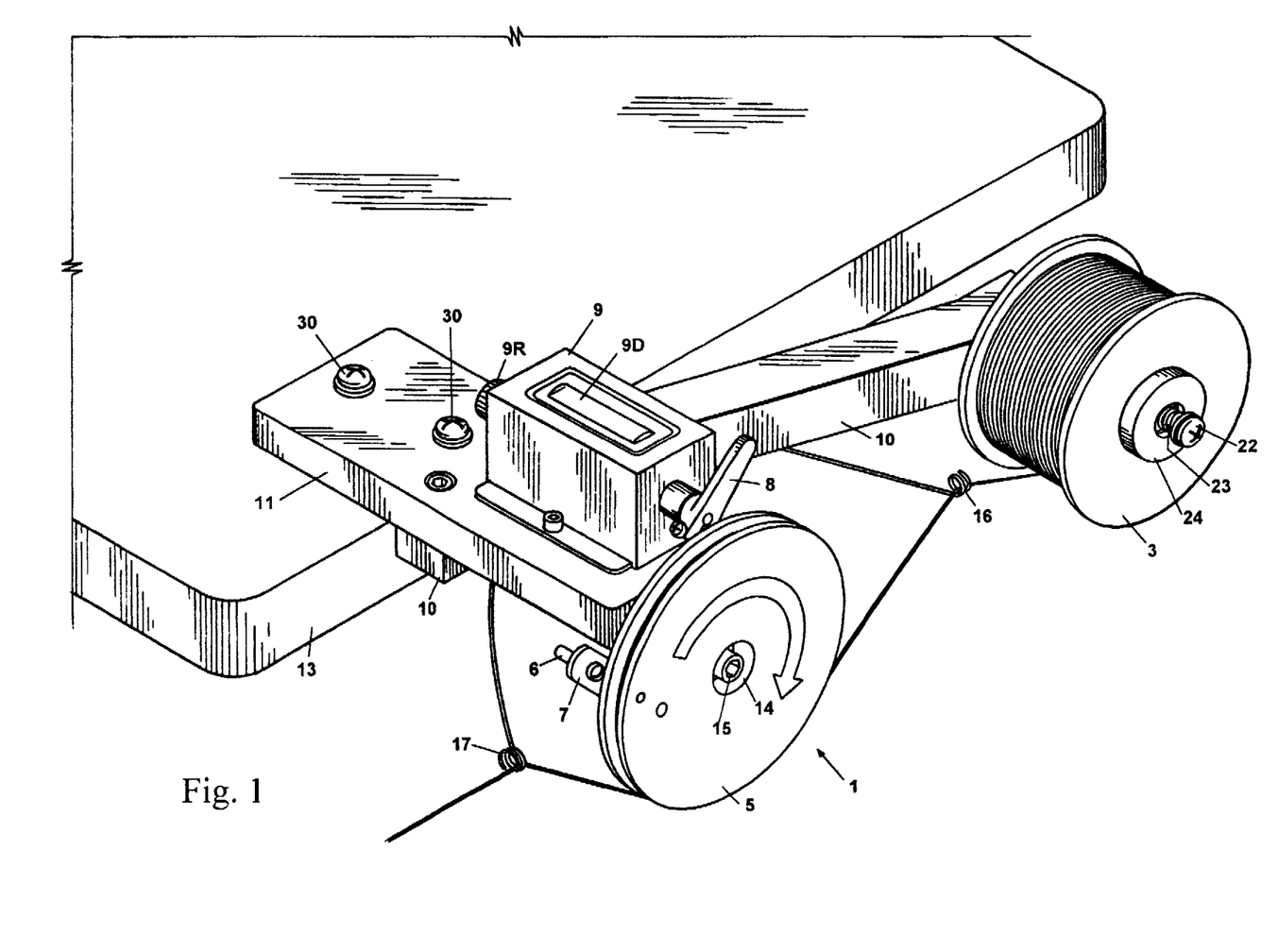
FIG. 1 is a perspective view of a fishing line measuring device secured to a work bench with a spool of bulk line in place and showing an unwound portion of line extending over a counter actuating pulley.
Figure 2:
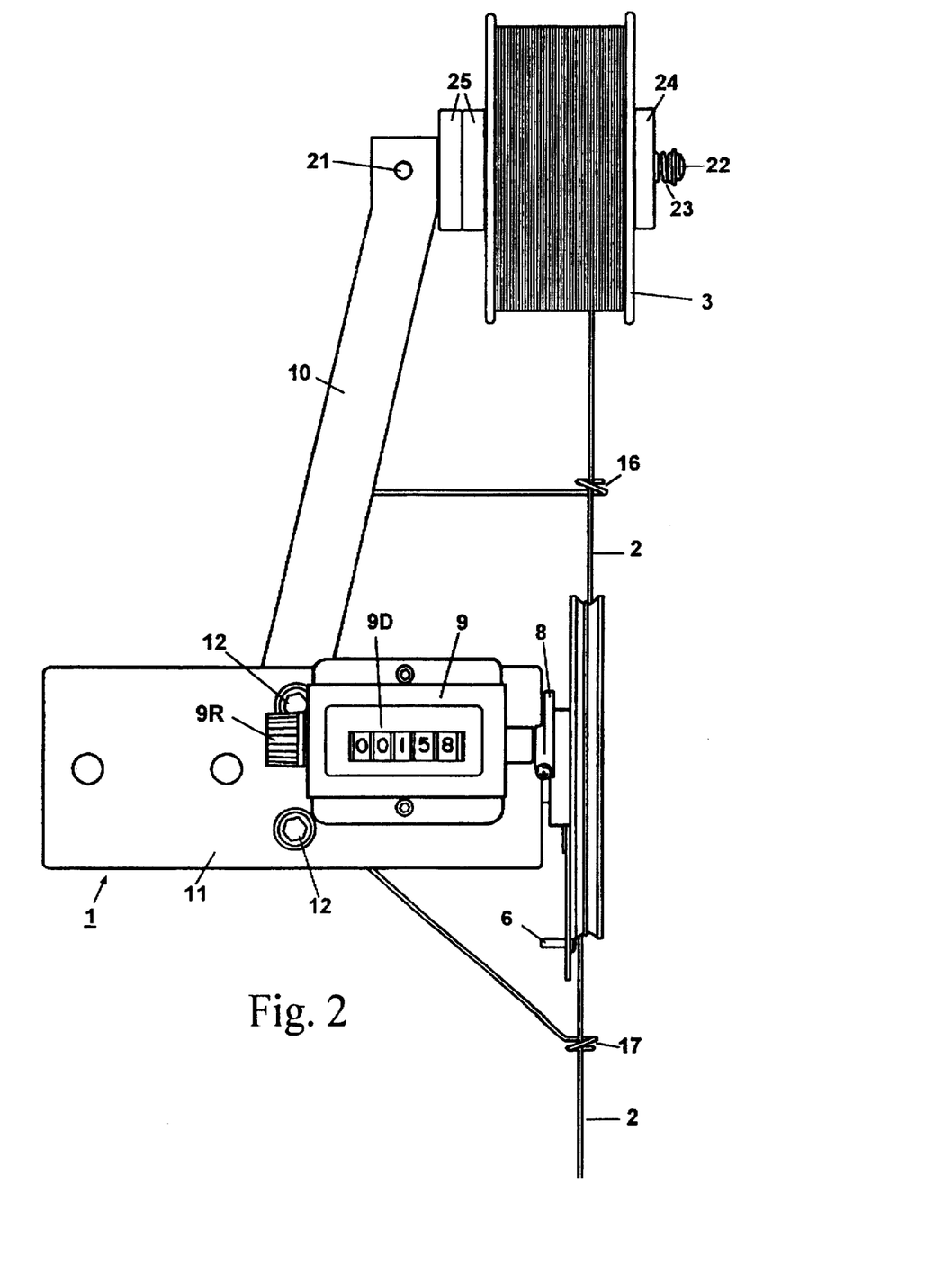
FIG. 2 is a top view of the line measuring device shown in FIG. 1.

In FIGS. 1–2, a small lightweight portable line supply and measuring device 1 provides means for measuring the length of fishing line 2 being unwound from a spool 3 of bulk line. The line is wrapped once clockwise around a thin round grooved pulley 5 to frictionally drive the pulley as the line is being pulled from the spool 3 by any fishing reel apparatus (not shown) onto which a user of this measuring device 1 wishes to load a length of line 2 from the spool 3. The pulley 5 carries an actuating element in the form of a stainless steel screw 6 threaded in a radially extending plate arm 7 secured to the back side of the pulley 5 as seen in FIG. 1. The projecting end of the screw 6 is not threaded and travels clockwise in a circular path, as indicated by the arrow on the pulley, to strike once per revolution an actuatable element in the form of a lever arm 8 of a mechanical digital counter 9 for computing and indicating line length.

The pulley 5, counter 9 and spool 3 are carried by a T-shaped support frame structure comprising a stem member 10 and a crossed member 11 which is secured to one end of the stem member 10 by screws 12. The counter 9 is secured by screws to a first end of the crossed member 11 with the counter and the spool being on the same side of the stem member as seen in FIGS. 1 and 2. The other end of the crossed member 11 has a broad flat undersurface which provides means whereby the support structure may be screwed or clamped to a table or work bench 13, with the stem member parallel to and just off the edge of the bench 13 and with the spool 3 and pulley 5 conveniently accessible just beyond the bench edge, or otherwise held or anchored in a relatively fixed position and conveniently located with respect to the reeling apparatus during line transfer thereto.

Figure 4:
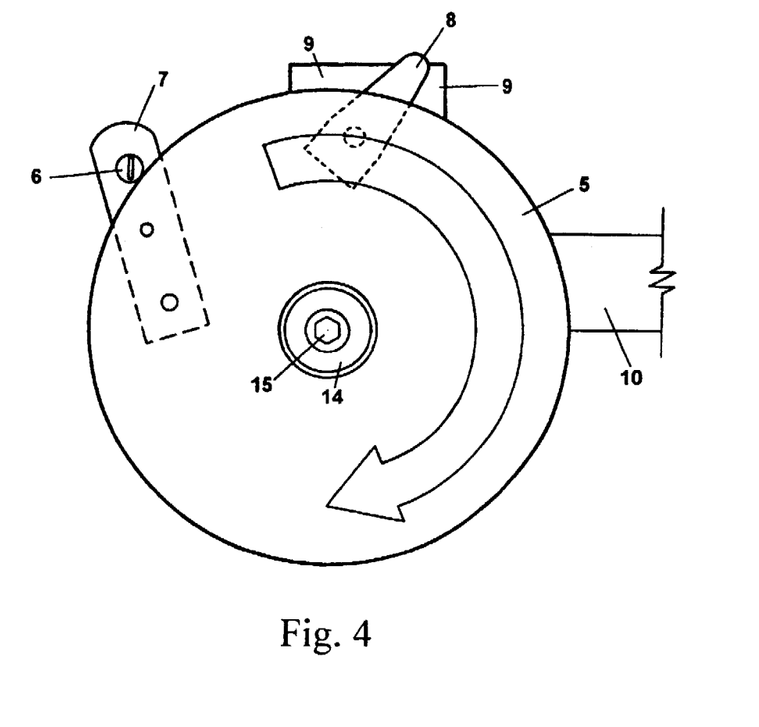
FIG. 4 is a side view of the pulley of FIG. 2.
Figure 5:
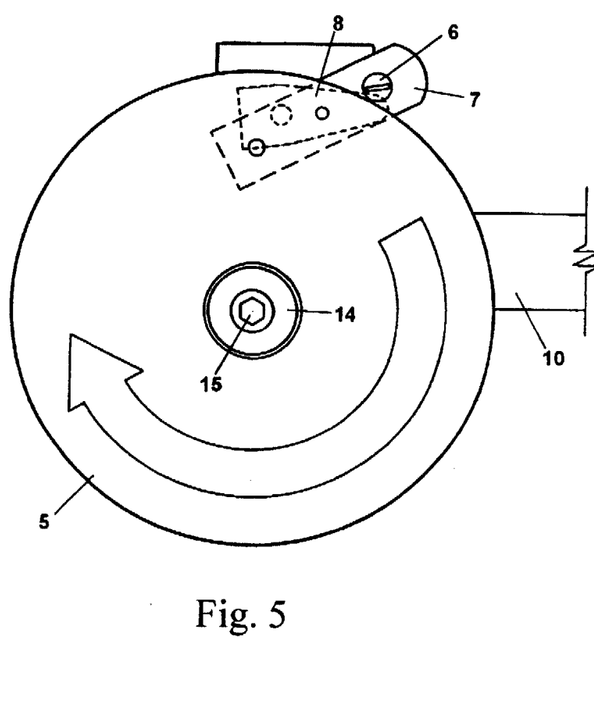
FIG. 5 is a view like FIG. 4 with the pulley in an advanced counter-actuating position.

The counter 9 providing a means for indicating line length passing over the pulley 5 is a conventional commercially available ratchet-operated counter in which the arm 8 is spring biased counter-clockwise to a stopped position as viewed in FIGS. 1 and 4. As the pulley rotates from the position of FIG. 4 to the position of FIG. 5, the smooth unthreaded tip of the screw 6 engages and slides along the smooth upper edge of the arm 8 to actuate the arm clockwise. Each time the screw 6 passes over the arm 8 the counter increases by one digit the first or units counter wheel of the counter display 9D (showing number 8 in FIG. 2) and the other wheels are advanced in the well known manner as the pulley rotation count increases by factors of 10, 100, etc. Rotation of the actuator element 6 effects a progressive sequence of audible sounds, each indicating progress of a predetermined one foot of length of reeled line when the spring biased actuated element 8 is released to snap back to the stop position shown in FIG. 4. The counter 9 has a manual reset knob 9R to reset it to zero before the beginning of each transfer of line from the bulk spool 3 to a reel.

The pulley 5 is freely-rotatably mounted on the end of the crossed member 11 in any suitable manner with a very low friction, preferably sealed, ball bearing 14 having an outer race pressed into the pulley 5 and an inner race secured to the support member 11 adjacent to the counter 9 by a screw 15.

The groove at the outer periphery of the pulley 5 has a narrow semicircular cross section one-quarter inch wide and shallow one-eighth inch deep and has a very smooth finish. The pulley groove is manually accessible around its entire length making it easy to use ones fingers to place the line in the groove and looped once therearound. The semicircular shape keeps the line sliding down to the bottom center of the groove as the pulley is continuously rotated during transfer of a desired length of line. The circumference of the bottom of the pulley groove is one foot whereby the count on the digital counter display 9D indicates the number of feet which have been reeled over the pulley 5. The diameter of the pulley groove is approximately 3.82 inches. This diameter is sufficiently large so that the curvature of line passing around the pulley poses essentially no permanent bending in either non-metallic or wire lines used by typical sports fishermen. This groove inner circumference is also beneficial not only in that it enables the use of a readily available low cost digital ratchet-type counter as described, but also its size is convenient to facilitate manually wrapping the line around the pulley which may involve placing a finger over the groove where the line is first placed in the groove to retain the line therein until a complete turn of the line is in the pulley groove after the line passes through an entry guide 16. The guide 16 assures that as the line is unwound from different positions on the spool 3 it will maintain the same orientation tangential to the bottom of the groove and essentially in the vertical plane of the thin pulley 5 in entering the narrow and shallow pulley groove. Similarly a discharge guide 17 maintains the same orientation of the line tangential to the bottom of the groove and essentially in the vertical plane of the pulley 5 as the line leaves the narrow and shallow pulley groove, notwithstanding that the subsequent course of the line beyond guide 17 may move to positions away from this plane as the reel position is varied or the point of winding on the reel is varied. When the line discharged from the pulley is directed, for example, to a small line guide on a rod carrying a reel to be loaded and the rod line guide is kept near the plane of the pulley, the guide 17 (or 19 in FIG. 7) may be omitted or not used.

Figure 3:
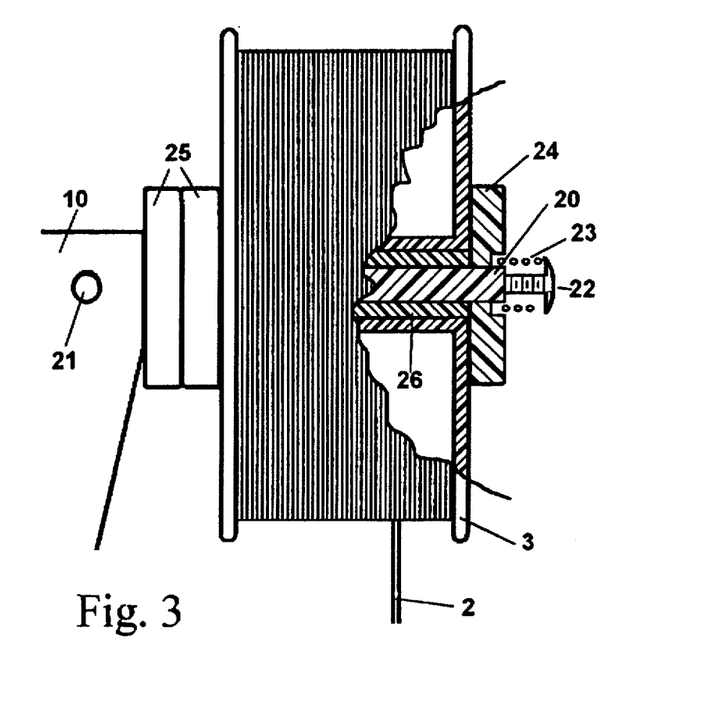
FIG. 3 is a partially cut away view of part of FIG. 2 showing bulk spool mounting details which enable selective sizing of a spool supporting spindle.

As seen in detail in FIG. 3, the spool 3 is rotatably supported on a selectably sized stationary spindle 20 replaceably secured at one end to the stem member 10 by a roll spring expanpin 21. A screw 22 threaded in the other or free end of the spindle adjustably compresses a helical spring 23 which presses a spindle encircling washer 24 against a face of the spool to hold the spool 3 and two size-adjusting washers 25 together against the stem member 10. The adjustment of the compression of spring 23 enables the frictional drag of the washers on the spool to be varied and selected to provide means to keep the line in tension and prevent unwinding rotation of the spool except when line 2 is pulled therefrom by the reeling apparatus being loaded from the bulk line spool 3. An adapter sleeve 26 adapts the spool core size to the external spindle size. The spindle 20 provides a horizontal rotational axis of the spool 3 parallel to the rotational axis of the pulley 5. These axes are kept horizontal parallel to the top surface of table 13 to facilitate keeping the looped line 2 in a vertical plane and in the groove of pulley 5 during the reeling transfer of line from the spool.

The guides 16 and 17 are formed by short helical loops on the ends of spring wires which have their other ends secured in any suitable manner to the stem member 10 of the T-shaped support structure. The guides 16 and 17 allow an intermediate portion of line 2 to be held between the fingers of two hands and manipulated transversely to be conveniently threaded into the guides without having to thread the tip of the line into the guides. The resiliency of the spring wires forming the guides 16 and 17 allows them to deflect slightly up and down as the line is kept in tension during the reeling transfer of line 2. The guides 16 and 17 are positioned to provide slightly more than one complete turn of the line around the pulley between the points where the line enters and leaves the groove tangentially.

Figure 6:
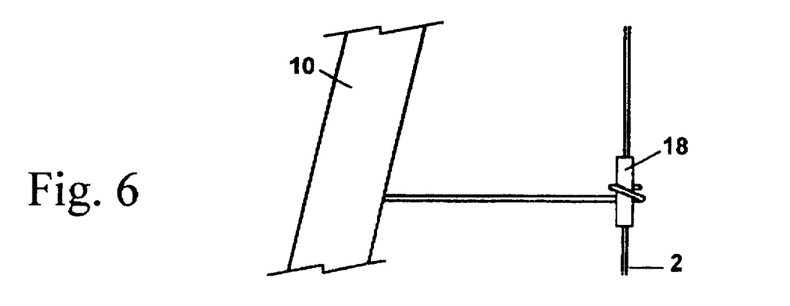
FIGS. 6 and 7 illustrate a modification of line guides shown in FIGS. 1 and 2.
Figure 7:
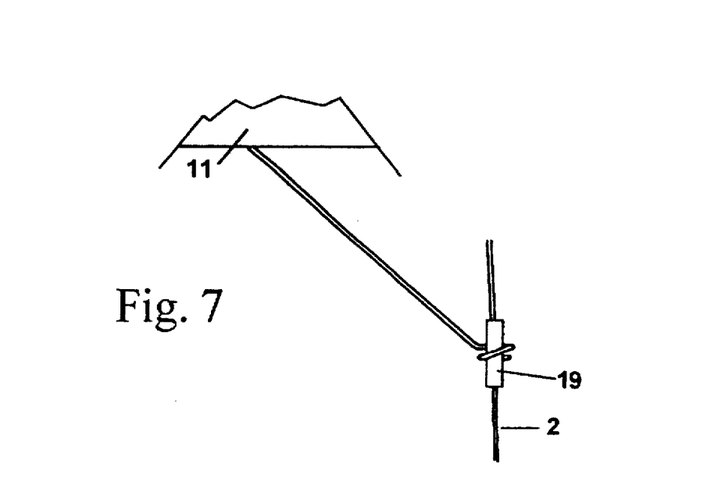

An alternative configuration of the guides 16 and 17 is shown in FIGS. 6 and 7 wherein short sleeves 18 and 19 of low friction plastic material are held within helically coiled ends of the spring guide wires. Here the line is threaded axially through the sleeves.

Figure 8:
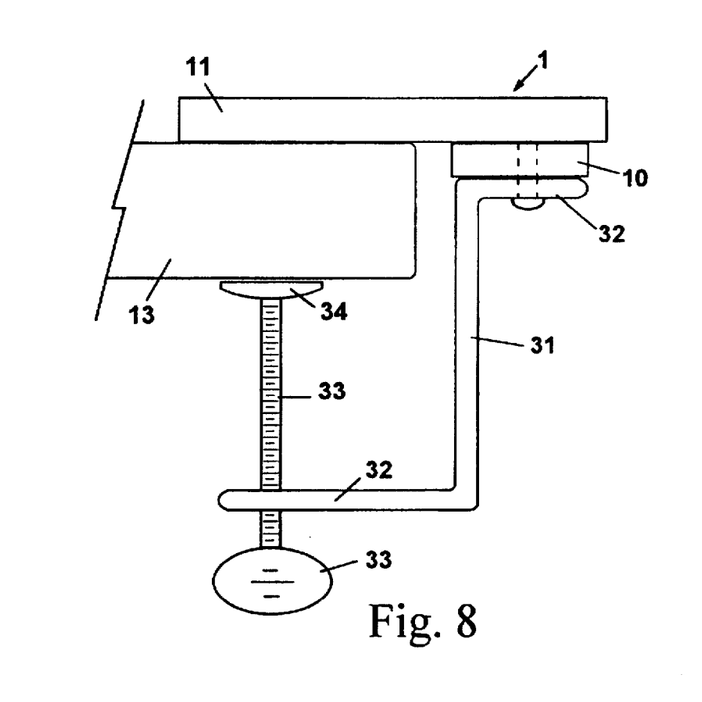
FIG. 8 shows a modified arrangement for clamping the device of FIG. 1 to the edge of a table.

In lieu of the screws 30 in FIG. 1 for securing the device 1 to the edge of the bench or table 13, the device may be supplied with a further clamping accessory as seen in FIG. 8. A bracket 31 is attached to the bottom of the stem member 10 below the crossed member 11 and has a flat portion 32 extending horizontally parallel to the broad flat undersurface of member 11 resting on the upper surface of table 13. The flat portion 32 is in spaced relationship to the underside of the table 13 and has one or more vertical thumbscrews 33 threaded in the portion 32 for pressing washer-like elements 34 rotatably carried on the ends of the thumbscrews against the underside of the table 13 to clamp the device 1 to the edge of table 13 or to any similar edge such as at a seat in a fishing boat. Other universal clamping apparatus may be connected to the crossed member 11, at its left end as seen in FIG. 1, for clamping the device 1 to any support while keeping the device 1 outwardly cantilevered in the horizontal orientation shown in FIG. 1 where the spool 3, pulley 5, guides 16 and 17 and the counter 9 all project unobstructed beyond the edge of the table 13 and are conveniently manually accessible from all sides.

For indicating measured transferred line lengths in other units of length such as yards or meters, other types of geared or intermittent couplings can be used between the pulley and a suitable counter with appropriate counter calibration based on a similar practical pulley diameter as that of the embodiment described herein.

Most of the device 1 including members 10 and 11 of the T-shaped support, pulley 5, spindle 20 and arm 8, is made of aluminum to significantly reduce the weight of the line supply and measuring device 1. The arm 8 which may be subject to some wear may be readily replaced. All of the parts are either off-the-shelf commercial products or of very simple configuration enabling low cost to acquire or manufacture individually with resultant low cost of the assembled line supply and measuring device 1. A kit having various lengths and/or sizes of the spindle 20, plastic washers 24 and 25, and plastic adapter sleeve 26 may be economically provided with the device to adapt it for use with a large variety of line spool sizes and capacities which are available to fishermen.

Other variations within the scope of this invention will be apparent from the described embodiment and it is intended that the present descriptions be illustrative of the inventive features encompassed by the appended claims.

What is claimed is:

1. A device for supplying fishing line to a fish reeling device from a bulk fishing line spool and measuring the length of line pulled from the spool by the reeling device comprising:

a T-shaped support having a stem portion and a crossed portion at one end of the stem portion, a spindle member at the other end of said stem portion extending horizontally during normal use on one side of the stem parallel to said crossed portion, manually releasable retaining means on said spindle member for rotatably retaining a spool of bulk fishing line on the spindle member for unwinding line from the spool and including friction means for applying friction to the spool to provide a preselected drag to the spool during unwinding of line to prevent spool overrun and keep the line in tension, said crossed portion of the T-shaped support having a first end extending from said stem on said one side and parallel to said spindle, a circumferentially grooved round pulley rotatably supported on said first end of the crossed portion with its axis of rotation being parallel to said spindle, said pulley having a shallow groove of semicircular cross section and an inner circumference of predetermined length at the bottom of the groove, guiding means extending from said support and having a line-encirclable manually line-threadable guide portion between said spindle and said pulley at the plane of the pulley for guiding line from the spool to tangentially enter said groove, said pulley groove being manually accessible to enable line extending from said guide portion to be manually wrapped once around the pulley in frictional contact in said groove with the line extending further to the reeling device to drive the pulley when the line is pulled during reeling, line length indicating means coupled to said pulley for counting revolutions of the pulley as line is pulled from the spool for computing and indicating reeled line length based on said the predetermined length of said inner circumference of the groove.

2. A fishing line reeling and measuring device according to claim 1 including a further guiding means extending from said support and having a line encirclable manually line-threadable guide portion through which the line passes at the plane of the pulley after rolling around the pulley to assure retention of the line in the pulley groove when pulled by the reeling device.

3. A fishing line reeling and measuring device according to claim 1 wherein said groove is about one quarter inch wide.

4. A fishing line reeling and measuring device according to claim 3 wherein said predetermined length of the groove inner circumference is one foot.

5. A fishing line reeling and measuring device according to claim 1 wherein said line length indicating means comprises an actuatable element and said pulley has an actuating element rotatable therewith for actuating the actuatable element once for each pulley revolution to provide an indication of reeled line length.

6. A fishing line reeling and measuring device according to claim 5 wherein said actuating element contacts said actuatable element to count revolutions of the pulley.

7. A fishing line reeling and measuring device according to claim 6 wherein said elements actuate a resettable mechanical digital counting device included in said line length indicating means.

8. A fishing line reeling and measuring device according to claim 5 wherein said line length indicating means produces sequential audible sounds each of which indicates progress of a predetermined length of measured reeled line.

9. A fishing line reeling and measuring device according to claim 1 wherein said crossed portion of the T-shaped support has a second end extending from said stem for securing said T-shaped support to a stationary supporting structure.

10. A device for supplying fishing line to a fish reeling device from a spool of bulk fishing line and measuring the length of line pulled from the spool by the reeling device comprising:

a support having a stem portion and a transverse arm portion at one end of and at one side of the stem portion, a spindle member at the other end of said stem portion extending horizontally during normal use on said one side of the stem and parallel to said transverse arm portion, manually releasable retaining means on said spindle member for rotatably retaining a spool of bulk fishing line on the spindle member for unwinding line from the spool and including friction means for applying friction to the spool to provide a preselected drag to the spool during unwinding of line to prevent spool overrun and keep the line in tension, a circumferentially grooved round pulley rotatably supported on said transverse arm portion with its axis of rotation being parallel to said spindle, said pulley having a shallow groove of semicircular cross section and an inner circumference of predetermined length at the bottom of the groove, guiding means extending from said support and having a line-encirclable manually line-threadable guide portion between said spindle and said pulley at the plane of the pulley for guiding line from the spool to tangentially enter said groove, said pulley groove being manually accessible to enable line extending from said guide portion to be manually wrapped once around the pulley in frictional contact in said groove with the line extending further to the reeling device to drive the pulley when the line is pulled during reeling, line length indicating means coupled to said pulley for counting revolutions of the pulley as line is pulled from the spool for computing and indicating reeled line length based on said the predetermined length of said groove inner circumference.

11. A fishing line reeling and measuring device according to claim 10 including a further guiding means extending from said support and having a line encirclable manually line-threadable guide portion through which the line passes after rolling around the pulley to assure retention of the line in the pulley groove when pulled by the reeling device.

12. A fishing line reeling and measuring device according to claim 10 wherein said groove is about one quarter inch wide.

13. A fishing line reeling and measuring device according to claim 12 wherein said predetermined length is one foot.

14. A fishing line reeling and measuring device according to claim 10 wherein said line length indicating means comprises an actuatable element and said pulley has an actuating element rotatable therewith for actuating the actuatable element once for each pulley revolution to provide an indication of reeled line.

15. A fishing line reeling and measuring device according to claim 14 wherein said elements actuate a resettable mechanical digital counting device.

16. A fishing line reeling and measuring device according to claim 10 wherein said support includes mounting means for securing said device to a supporting surface with the spindle and pulley accessibly located horizontally outwardly beyond the supporting surface.

17. A device for supplying fishing line to a fish reeling device from a spool of bulk fishing line and measuring the length of line pulled from the spool by the reeling device comprising:

a support having a stem portion and a transverse arm portion at one end of and at one side of the stem portion, a spindle member at the other end of said stem portion extending horizontally during normal use on said one side of the stem and parallel to said transverse arm portion, manually releasable retaining means on said spindle member for rotatably retaining a spool of bulk fishing line on the spindle member for unwinding line from the spool and including friction means for applying friction to the spool to provide a predetermined drag to the spool during unwinding of line to prevent spool overrun and keep the line in tension, a circumferentially grooved round pulley rotatably supported on said transverse arm portion with its axis of rotation being parallel to said spindle, said pulley having a shallow one quarter inch wide groove of semicircular cross section and an inner circumference of one foot at the bottom of the groove, guiding means extending from said support and having a line encirclable manually line-threadable guide portion between said spindle and said pulley at the plane of the pulley for guiding line from the spool to tangentially enter said groove, said pulley groove being manually accessible to enable line extending from said guide portion to be manually wrapped once around the pulley in frictional contact in said groove with the line extending further to the reeling device to drive the pulley when the line is pulled during reeling, line length indicating means coupled to said pulley for counting revolutions of the pulley as line is pulled from the spool for computing and indicating reeled line length based on the length of said groove inner circumference.

18. A fishing line reeling and measuring device according to claim 17 wherein said line length indicating means comprises an actuatable element and said pulley has an actuating element rotatable therewith for actuating the actuatable element once for each pulley revolution to provide an indication of reeled line.

19. A fishing line reeling and measuring device according to claim 18 wherein said elements actuate a resettable mechanical digital counting device.

20. A fishing line reeling and measuring device according to claim 17 wherein said support includes mounting means for securing said device to a supporting surface with the spindle and pulley accessibly located horizontally outwardly beyond the supporting surface.

* * * * *